United States Patent [19]

Schnöring et al.

[11] 3,915,909

[45] Oct. 28, 1975

[54] RECOVERY OF RUBBER AS A POWDER FROM ITS AQUEOUS DISPERSION

[75] Inventors: Hildegard Schnöring, Wuppertal-Elberfeld; Gottfried Pampus, Leverkusen, both of Germany

[73] Assignee: Bayer Aktiengesellschaft, Germany

[22] Filed: June 18, 1974

[21] Appl. No.: 480,561

[30] Foreign Application Priority Data
June 23, 1973 Germany............................ 2332096
May 25, 1974 Germany............................ 2425441

[52] U.S. Cl......... 260/17 R; 260/17.4 BB; 260/751; 260/815; 260/816; 260/821; 260/822
[51] Int. Cl.²...................... C08C 1/15; C08L 1/28
[58] Field of Search........... 260/17 R, 17.4 BB, 751, 260/815, 816, 821, 822

[56] References Cited
OTHER PUBLICATIONS

Chem. Absts: 68: 79292g, "Effect—additives—coagulation—latexes," Kiseleva et al.
Chem. Absts.: 68: 3655g, "Coagulation—Dispersions," Heinz.

*Primary Examiner*—Melvin Goldstein
*Assistant Examiner*—Edward Woodberry
*Attorney, Agent, or Firm*—Connolly and Hutz

[57] ABSTRACT

A process for isolating rubbers from their aqueous dispersions (latices), wherein a cellulose ether is added to an aqueous rubber dispersion in a quantity of 0.1 to 10 % by weight, based on the rubber, and a water-soluble alkali metal, alkaline earth metal, aluminium or zinc salt is added in a quantity of 0.02 to 10 % by weight, based on the rubber and the water is removed from this mixture.

2 Claims, No Drawings

RECOVERY OF RUBBER AS A POWDER FROM ITS AQUEOUS DISPERSION

This invention relates to a process for isolating rubbers from their aqueous dispersions (latices). In the process a $C_1$-$C_4$ alkyl cellulose or a hydroxy alkyl cellulose is added to an aqueous rubber dispersion in an amount of 0.1 to 10 % by weight, preferably 0.1 to 5 % by weight, based on the quantity of rubber, and a water-soluble alkali metal salt, alkaline earth metal salt, aluminium salt or zinc salt is added in an amount of 0.02 to 10 % by weight, based on the rubber, and the water is then removed from the resulting mixture.

According to a preferred embodiment of the process a 0.1 to 10 % by weight aqueous solution of a $C_1$-$C_4$ alkal cellulose or a hydroxy alkyl cellulose (in the following referred to as "cellulose ethers") in which the water-soluble alkali metal salt, alkaline earth metal salt, aluminium salt or zinc salt is dissolved is first added to the mixture of a rubber dispersion in such an amount that the resulting mixture contains 0.1 to 10 % by weight, preferably 0.1 to 5 % by weight of the cellulose ether, based on the rubber, and this mixture is then mixed with water in such a quantity that the rubber precipitates. The weight ratio of cellulose ether to salt in the aqueous cellulose ether solution is preferably from 1:2 to 5:1. The coagulate is then separated mechanically and if desired washed with water and the remaining water is then removed. A coagulate is obtained which is almost completely free from contaminants such as emulsifiers, catalyst residues and the like. Contaminants of this kind are removed together with the water when the coagulate is separated, and any remaining residues can be washed out with water.

Rubbers in the context of this invention include all synthetic rubbers which are used as elastomers, binders or coating substances, for example diene rubbers such as homopolymers of conjugated diolefines with preferably 4 to 8 carbon atoms (butadiene, isoprene, piperylene, chloroprene) and copolymers of conjugated diolefines with ethylenically unsaturated compounds, e.g. aliphatic vinyl compounds and aromatic vinyl compounds. The following are specific examples: acrylic and methacrylic acid derivatives such as acrylonitrile, acrylamide, methacrylonitrile, methacrylamide, alkyl acrylates containing 1–6 carbon atoms (ethyl acrylate, butyl acrylate), alkyl methacrylate containing 1–6 carbon atoms (methyl methacrylate), styrene, α-methylstyrene, vinyltoluene, vinylpyridine, divinylbenzene, copolymers of ethylene with vinylacetate or vinyl chloride and copolymers of acrylic esters.

Among this group of rubbers, the following are preferred: polybutadiene, styrene-butadiene copolymers, butadiene-acrylonitrile copolymers, polychloroprene, polyisoprene and acrylic ester copolymers. All these rubbers may have any steric configuration, that is to say the arrangement of double bonds may be cis or trans and the dienes may by polymerised in the 1,4-, 3,4- or 1,2-position and in the case of copolymers the distribution of the monomer units may be statistical, alternating or blockwise.

Ethylene rubbers, propylene rubbers and ethylene and propylene terpolymers are also suitable. The weight ratio of ethylene to propylene is generally from 80:20 to 20:80 and the tercomponent is preferably present in quantities of 2 to 20% by weight and constitutes a non-conjugated diolefine such as norbornadiene, 1,4-hexadiene or ethylidene norbornene.

Polyalkenamer rubbers which are obtained by ring opening polymerisation of cyclic olefines are also suitable. Of particular interest are homopolymers of cyclomonoolefines which contain 4,5 or 7–12 carbon atoms, e.g. trans-polypentenamers. These rubbers which are prepared by solution polymerisation with organometallic mixed catalysts or with metal alkyls are converted into solvent-free dispersions or latices by known processes using known emulsifiers or in accordance with German Offenlegungsschrift No. 2,013,359. These dispersions are then made up into rubber powders in accordance with the invention.

The above mentioned rubbers may contain up to 50% by weight of known extender oils (e.g. paraffinic or aromatic mineral oils) or conventional plasticizers (such as dioctyl phthalate or tricresylphosphate or low molecular weight polyethers). Furthermore, known vulcanization systems may already be partly or completely incorporated in these rubbers.

The microstructure, molecular weight and gel content of the polymers are not critical. Rubbers with molecular weights as low as a few thousand may be used.

Many of these rubbers are obtained as aqueous dispersions (latex) or can easily be converted into the latex form. These latices generally contain 10 to 60% by weight of rubber, based on the total quantity of latex.

Since rubbers are sticky products in the crude state, their isolation as solid substances from solutions in organic solvents or from latices is very difficult. When such methods of isolation are employed, the rubber is generally obtained in the form of sticky lumps.

The process according to the invention is preferably applied to rubber latices which have been stabilized with anionic emulsifiers. These emulsifiers are preferably used in quantities of 0.1 to 5% by weight, based on the rubber, and the following are suitable examples: Long chain fatty acids, resinic acids, disproportionated abietic acids and their condensates with formaldehyde alkyl and alkylaryl sulphonates and sulphates. Alkali metal (sodium, potassium) salts of alkyl or alkylarylsulphates or sulphonates are particularly preferred. The alkyl groups preferably contain 8 to 20 carbon atoms. The alkyl-aryl groups are preferably combinations of aryl groups with 6 to 20 carbon atoms and alkyl groups with 2 to 20 carbon atoms. Phenyl and naphthyl are examples of suitable aryl groups. Particular emulsifiers are the sodium salts of alkyl sulphonates which have an average of 14 carbon atoms in the alkyl group, sodium salts of diisobutylnaphthalene sulphonic acid, sodium salts of the condensation product of formaldehyde and naphthalene sulphonic acid and sodium salts of isobutyl naphthalene sulphonic acid.

Latices of this kind and methods of preparing them are already known. In principle, they are prepared by adding an activator to an aqueous emulsion containing the monomers and emulsifier and then adjusting the solids content of the resulting polymer dispersion to the desired concentration (e.g. 30 to 60% by weight).

The residual monomers may be removed after polymerisation, the molecular weight of the polymer may be controlled by chain transfer agents during polymerisation, and stabilisers and/or anti-ageing additives may be added to the latex. Fillers (carbon black, silicates), solid substances, vulcanising agents and vulcanisation accelerators may also be added.

The cellulose ethers used in this invention are commercially available products. They are 1. water soluble $C_1$-$C_4$ alkyl celluloses, i.e. celluloses wherein part of the hydroxyl groups of the cellulose molecule are etherified with $C_1$-$C_4$ alkyl radicals. Suitable are inter alia methyl, ethyl, propyl and butyl celluloses preferred is methyl cellulose, 2. hydroxy alkyl celluloses, i.e. celluloses wherein part of the hydroxyl groups of the cellulose molecule are etherified with hydroxy alkyl groups. Hydroxy alkyl groups in the context of this invention are preferably straight chain or branched alkyl radicals having 2 to about 10 carbon atoms, wherein 1 or more —$CH_2$— groups may be replaced by —O— and which have a hydroxy group as a substituent. The hydroxy group can be a primary or a secondary hydroxy group.

Examples of such radicals are

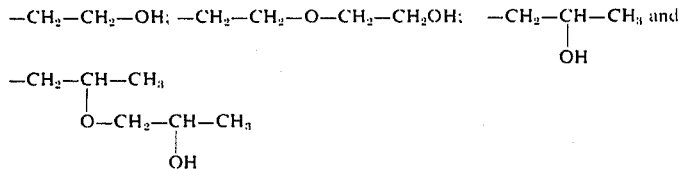

The degree of substitution of the alkyl respectively hydroxy alkyl celluloses is preferably 0.5 to 3, i.e. each glucose unit of the cellulose carries an average of 0.3 to 3 alkyl respectively hydroxy alkyl substituents.

The molecular weight of the cellulose ethers is preferably selected so that a 5 % by weight aqueous solution of the cellulose ether in water at 20°C has a viscosity of about 100 to about 100,000 cP. Especially suitable are those cellulose ethers which have a decreasing solubility in water at an increasing temperature of from 20° to 80°C.

Most preferably the degree of substitution, especially in methyl cellulose is about 0.8 to about 2. The most preferred molecular weight range corresponds to a viscosity of a 5% by weight aqueous solution of 15,000 to 40,000 cP. This is also valid especially in the case of methyl cellulose.

The water-soluble alkali metal salts, alkaline earth metal salts, aluminium salts or zinc salts used are preferably chlorides, sulphates and phosphates of sodium, potassium, calcium, magnesium, aluminium and zinc, e.g. NaCl, $Na_2CO_4$, $KHSO_4$, $NaH_2PO_4$, $MgSO_4$, $Al_2(SO_4)_3$ or $ZnCl_2$ and salts of these metals with strong organic acids such as formic acid, acetic acid, or chloroacetic acid, e.g. sodium, potassium, magnesium or aluminium formates, acetates or chloroacetates.

The process according to the invention may be carried out, for example, as described below:

The cellulose ether and a water-soluble alkali metal salt, alkaline earth metal salt, aluminium salt or zinc salt are both added at the same time to a rubber latex. The quantity of cellulose ether used is calculated so that the resulting mixture contains 0.1 to 10 and preferably 0.1 to 2.5 parts by weight of cellulose ether and 0.02 to 10 parts by weight, preferably 0.02 to 5 parts by weight of the salt per 100 parts of rubber. The quantity of salt, based on cellulose ether, is 20–100 parts by weight for every 100 parts by weight of cellulose ether. The cellulose ether may be added as an aqueous solution in which the salt is also dissolved but alternatively a solid mixture of cellulose ether and salt may be used.

A mixture of this kind is preferably prepared by spray drying an aqueous cellulose ether solution which contains the salt in solution. The resulting porous, solid product is particularly readily soluble in water. To improve its solubility, a small quantity preferably 1 to 15 % by weight based on cellulose ether, of a polyhydric alcohol such as ethylene glycol, glycerol, polyethylene glycol or polyglycol ether may be added. Before the resulting product is added to the latex, it is advantageous first to stir it up with a small quantity of water preferably at a temperature of 60° to 100°C. It is also possible to introduce cellulose ether and salt separately. In this case the salt can be added immediately prior to or after the cellulose ether.

The rubber precipitates when water is added to the latex which contains cellulose ether and salt. Particles with a diameter of about 3 mm to about 100 $\mu$ are obtained. Depending on the weight of the rubber, the coagulate either creams (i.e. it collects on the surface of the liquid) or it forms a sediment and can easily be separated from the major portion of aqueous phase obtained. All the impurities in the rubber latex are in this way substantially removed at the same time, provided they are water-soluble. This applies particularly to emulsifiers and water-soluble catalyst residues. It is surprisingly found that the particles of coagulate obtained in this way do not stick together. To reduce the amount of impurities even further they may be washed once more with water. The particles they may be washed once more with water. The particles, which still contain a high proportion of water, are then dried. If the rubber particles are kept in motion during this drying process to prevent their caking together, a free flowing dry rubber powder is obtained. In other words, drying is carried out in a "state of motion." This is achieved, for example, by fluidizing or stirring the particles, i.e. by using a flow drier or similar apparatus. No general rules can be given for the intensity of movement required. It must be sufficient to prevent caking of the particles and can easily be determined in each individual case. If drying is carried out without keeping the particles in motion, the rubber is obtained in a form which can easily be compacted to a solid mass by the usual methods (for example in the form of a strand). The coagulate can also be processed into compact rubber by means of conventional screw apparatus.

The size of the particles depends mainly on the quantity of water added, which should preferably be between 2 and 10 times the volume of the latex. It also depends on the temperature at which the water is added. In principle, temperatures of between 0° and 100°C may be employed but it is preferable to use water at a temperature of about 25° to about 80°C. The particle size increases with increasing temperature of the water. It is preferable to add the latex slowly to the water under conditions of vigorous mechanical mixing, for example by vigorous stirring.

The most suitable quantity of water, water temperature and intensity of stirring for obtaining optimum results must be determined for each individual case. These factors depend on the nature and concentration of the latices and are also affected by the nature and quantity of emulsifiers present. None of the measures mentioned above is so critical that only certain combinations lead to the desired result. The optimum combination can always be determined quite easily by means of a few preliminary tests.

If desired, the process may also be carried out by directly spray drying a mixture of rubber latex, cellulose ether and salt. By this method, the rubber is always obtained in the form of a powder and the addition of substantial quantities of water is avoided but on the other hand all the impurities are left in the rubber.

The process according to the invention yields rubber in the form of a pourable powder which is easy to handle so that its processing and the addition of additives are greatly facilitated.

Method of preparation of the polychloroprene latex used in the Examples:

The emulsion contains the following constituents: 190 g of chloroprene, 5 g of dichlorobutadiene, 0.02 g of tert-butyl pyrocatechol, 240 g of salt-free water, 9 g of the sodium salt of a disproportionated abietic acid, 1.4 g of the sodium salt of the condensation product of naphthalene sulphonic acid and formaldehyde, 1 g of caustic soda and 1 g of tetrasodiumpyrophosphate.

A 3% formamidine sulphinic acid in deionised water is used as catalyst. The monomer conversion is 65 to 70% and the residual monomer is removed by degasification.

Example 1

100 liters of polychloroprene latex prepared as described above are mixed with 5 kg of a 5% aqueous methyl cellulose solution (viscosity of 2% solution 50 cP, degree of substitution 1.8) which also contains 5% of sodium chloride in solution, and the mixture is heated to 50°C and in an impeller homogenizing apparatus it is then mixed with 3 times its quantity of water which has been heated to 70°C. The resulting flocs measuring about 0.5 mm which leave the homogenizing apparatus are conveyed to a creaming vessel together with the serum which is free of polymer. The polymer flocs float to the top and the serum is discharged. The polymer flocs are taken away to the usual rubber processing operations.

Example 2

350 g of a mixture containing methyl cellulose and sodium chloride in proportions by weight of 1:1 stirred up with 5 liters of water at 80°C are added to 100 kg of the polychloroprene latex prepared as described above. The mixture of ethyl cellulose and sodium chloride had been prepared by spray drying an aqueous solution of methyl cellulose and sodium chloride in proportion by weight of 1:1. When the methyl cellulose/sodium chloride mixture has dissolved in the latex, the latex is combined with 10 times its quantity of water at 80°C in a mixing apparatus. Flocs measuring about 3 mm are obtained. They are dewatered on a screen belt and then dried in a fluidized bed which is kept stirred to form the pulverulent rubber.

Example 3

An aqueous solution of 450 g of methyl cellulose, 300 g of sodium chloride, 50 g of aluminium sulphate and 100 g of polyethylene glycol is dried in a spray drier to form a powder with a residual water content of 10%. 230 g of this powder are stirred up with 3 liters of water at 80°C and stirred into 100 liters of polychloroprene latex prepared as described above. 1000 liters of water heated to 80°C are added to this latex mixture with stirring. A flocculant rubber coagulate is formed which can easily be separated. It is dried in an agitated fluidised bed to form a free flowing powder.

Example 4

A copolymer of butadiene and acrylonitrile having an acrylonitrile content of 33% is prepared by emulsion polymerisation in known manner. Alkylsulphonates were used as emulsifiers, tert-butyl hydroperoxide as initiator and dodecylmercaptan as molecular weight regulator.

100 kg of this latex which has a solids content of 31% by weight are added to 1.2 kg of a mixture containing methylcellulose and NaCl in proportions by weight of 1:1.25 which were stirred up in 5 liters of water at 80°C. The methyl cellulose/sodium chloride solution is stirred for a few minutes until the methyl cellulose has dissolved, thus causing a marked increase in the viscosity of the latex mixture. This mixture is fed into a continuous flow mixer together with four times its quantity of water which has been heated to 90°C. The resulting flocs which are the size of sand grains are fed into a stirrer vessel together with the serum, this stirrer vessel acting as buffer vessel. From there, the mixture is removed for mechanical dehydration and drying by heat. A rubber powder with a particle size of 0.5 mm is obtained.

Example 5

The procedure is the same as described in Example 2, using a latex of a copolymer of butadiene and styrene with a styrene content of 24% by weight which has been obtained by emulsion polymerisation in known manner, using resinic acid and oleic acid as emulsifiers. The latex had a solid rubber content of 24% by weight and the isolated rubber had a Mooney ML4' value of 48. The quantity of water fed into the mixing apparatus was reduced to one-third.

Example 6

The procedure is the same as described in Example 2, using a latex of a copolymer of butadiene and styrene with a styrene content of 22% by weight. The latex was prepared in a manner analogous to Example 5. The solids content was 26% and the rubber isolated from the latex by precipitation had a Mooney ML4' value of 124. The quantity of water fed into the mixing apparatus was reduced to half.

Example 7

A copolymer of butadiene and styrene having a styrene content of 22 % by weight was made by emulsion copolymerisation according to known methods. In making this copolymer alkali salts of long chain fatty acid and abietic acid were used as emulsifiers, tertbutyl hydroperoxide as initiator and dodecyl mercaptane as chain transfer agent.

100 kg of this latex having a solids content of 25 % by weight were mixed with 1.2 kg of a mixture of hydroxy propyl cellulose (viscosity of a 1 % aqueous solution 600 cp at 25°C) and sodium chloride at a weight ratio of 1:1.25 which mixture was prepared in 5 liters of water at 60°C. The mixture of latex, hydroxy propyl cellulose and sodium chloride was stirred for some minutes until the hydroxy propyl cellulose was dissolved which resulted in a marked increase of viscosity. The mixture thus prepared and simultaneously 4 times its volume of water of 90°C were introduced into an impellar homogenising apparatus. The resulting flocks measuring about 0.5 mm which leave the homogenising apparatus are conveyed to a creaming vessel and then the aqueous serum is mechanically removed and the solid thermically dried. A rubber powder was obtained having a grain size of about 0.5 mm.

Example 8

A copolymer of butadiene and acrylonitrile having an acrylonitrile content of 33 % were made by emulsion polymerisation according to known methods. As an emulsifier an alkyl sulfonate was used as an initiator tert-butyl hydroperoxide and as a chain transfer agent dodecylmercaptane were used.

100 kg of this latex having a solids content of 31 % by weight were mixed with 1.0 kg of a mixture of hydroxy propyl cellulose (viscosity of a 1 % aqueous solution 1500 cp at 25°C) and sodium chloride at a weight ratio of 1:1 which mixture was prepared in 5 liters of water at 45°C. The mixture of latex, hydroxy propyl cellulose and sodium chloride was stirred for 10 minutes until the hydroxy propyl cellulose was dissolved which resulted in a marked increase of viscosity of the mixture. This mixture is stirred into 3 times its amount of water at 90°C. The flakes thus produced are then separated from the aqueous phase and thermically dried. A rubber powder having a grain size of about 0.5 mm is obtained.

Example 9

100 kg of the latex of example 2 are mixed with 0.75 kg of a mixture of hydroxy propyl cellulose (viscosity of a 1 % aqueous solution at 25°C is 1500 cp) and sodium chloride at a weight ratio of 1:0.5 which mixture has been made in 5 liters of water at 45°C. The resulting mixture of hydroxy propyl cellulose, sodium chloride and latex is now stirred and introduced into 200 liters of water at 90°C which contained 0.25 kg of sodium chloride. Further processing and result was as in example 2.

We claim:

1. A process for recovering a rubber from its aqueous dispersion, said rubber being selected from the group consisting of polymers of dienes, polymers of ethylene, polymers of propylene, ethylenepropylene terpolymers and polyalkenamers, said process comprising adding to the aqueous dispersion of said rubber 0.1 to 10% by weight of a cellulose ether selected from the group consisting of a $C_1$–$C_4$ alkyl cellulose, a hydroxy $C_2$–$C_{10}$ alkyl cellulose and said hydroxy $C_2$–$C_{10}$ alkyl cellulose having at least one $CH_2$ group replaced by —O— and 0.02 to 10% by weight of a salt selected from the group consisting of water-soluble alkali metal salts, water-soluble alkaline earth metal salts, water-soluble aluminum salts and water-soluble zinc salts, said percentages being based on the weight of rubber in said aqueous dispersion thereof and there being from 20 to 100 parts by weight of said selected salt per 100 parts of said selected cellulose ether, mixing said aqueous dispersion of said rubber, said selected cellulose ether and said selected water-soluble salt with water until the rubber of said aqueous dispersion coagulates, separating resulting coagulate and drying said separated coagulate.

2. The process of claim 1 wherein said selected cellulose ether and said selected water-soluble salt are added to the aqueous dispersion of said rubber in the form of an aqueous dispersion.

* * * * *